May 6, 1969 J. F. SCHUH 3,443,117

SELF-ADAPTING SIGNAL TRANSFORMER

Filed April 5, 1965 Sheet 1 of 2

INVENTOR.
JAN FREDERIK SCHUH
BY Frank R. Trifari
AGENT

May 6, 1969 J. F. SCHUH 3,443,117

SELF-ADAPTING SIGNAL TRANSFORMER

Filed April 5, 1965 Sheet 2 of 2

INVENTOR.
JAN FREDERIK SCHUH
BY
Frank R. Trifari
AGENT

United States Patent Office 3,443,117

Patented May 6, 1969

3,443,117

SELF-ADAPTING SIGNAL TRANSFORMER

Jan Frederik Schuh, Emmasingel, Eindhoven, Netherlands, assignor to U.S. Philips Corporation, New York, N.Y., a corporation of Delaware Filed Apr. 5, 1965, Ser. No. 445,593
Claims priority, application Netherlands, Apr. 7, 1964, 6403655
Int. Cl. H01f *27/42*
U.S. Cl. 307—88 2 Claims

ABSTRACT OF THE DISCLOSURE

A signal transformer which is programmed by an external signal to provide a bivalent output in response to different combinations of signals on input terminals of the device.

Figure 1:
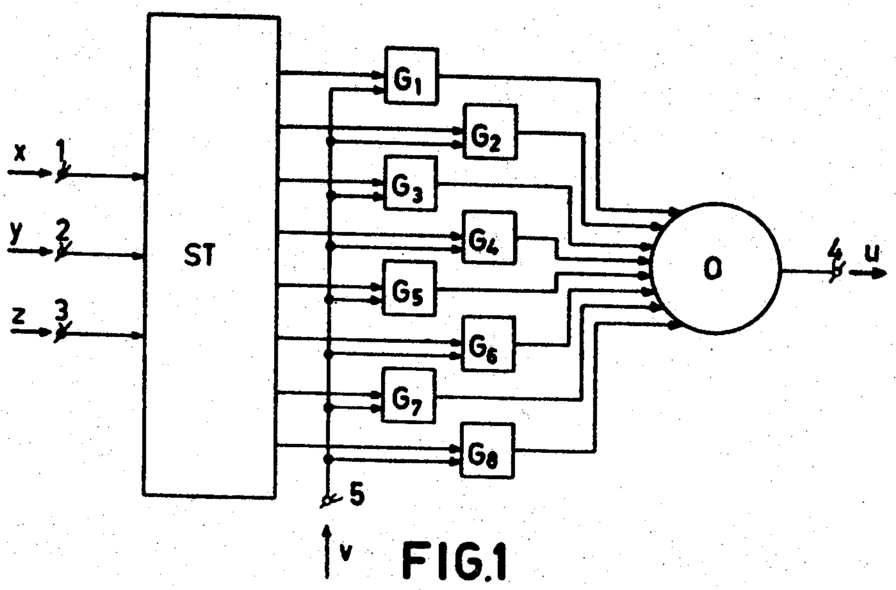

A signal transformer is understood to mean herein a circuit arrangement having at least two input terminals for receiving bivalent input signals and one output terminal for supplying a bivalent output signal, which circuit arrangement is constructed so that for every possible combination of values of the input signals it supplies an output signal of a particular value. A combination of values of the incoming signals is termed an incoming code group and a signal transformer converts every incoming code group into a bivalent output signal which is termed the answer to the incoming code group. It is already known how to construct a signal transformer which performs any given signal transformation.

However the problem becomes of a quite different nature when the signal transformaton to be performed is not given a priority and thus cannot be embodied in the configuration of the circuit arrangement itself, but must be communicated to the signal transformer in the form of signals. This latter may be effected, for instance, by presenting, each time that a code group to be transformed is received at the input terminals, a signal identified with the desired answer to an additional input terminal. The desired answer may thus differ from the answer actually supplied by the signal transformer.

When the signal transformer has received each of the possible incoming code groups and the associated desired answer at least once, the transformation to be performed by the signal transformer is communicated to it and the signal transformer can thus have adapted itself, at least theoretically, to the transformation prescribed. However, the construction of the self-adapting signal transformer may be such that it has adapted itself only when it has received all possible incoming code groups and the associated desired answers a number of times.

What a signal transformer of the above type actually has to do is to partition the incoming code groups into two classes, one class containing the incoming code groups, for which the answer is 0 and one class containing the incoming code groups, for which the answer is 1. In an article entitled: "Reliable, Trainable Networks for Computing and Control," Aero Space Engineering September 1962 p. 78 et seq., Bernard Widrow and James B. Angell have given a solution to this problem consisting in that an analogous signal is formed from the input signals $x, y, z \ldots$ which may be written as a linear function $\alpha x+\beta y+\gamma z+\ldots+\delta$ of the signals $x, y, z \ldots$ (which can assume only the values 0 or 1, or $-1$ or $+1$). The analogous signal may be interperted as a bivalent signal by interpreting the sign of this signal as the signal value. The signal transformer has been made self-adapting in that the coefficients $\alpha, \beta, \gamma, \ldots \delta$ (each of which may be positive or negative) are controlled by the relative analogous signal and the desired signal, in particular the difference between these two signals.

The signal transformer based on this principle has a number of properties which render it particularly suitable for certain purposes. A particular feature of this signal transformer, however, is that it cannot perform every partition into classes but only partitions into linearly separable classes. When a partition into non-linearly separable classes is desired, the signal transformer will adjust itself at a partition into linearly separable classes which in general approach more or less the desired partition, which may sometimes be of advantage. In other cases, however, there also exists a need for a self-adapting signal transformer which is not restricted to partitions into linearly separable classes and it is the object of the invention to provide such a signal transformer.

A self-adapting signal transformer according to the present invention comprises a number of input terminals for receiving incoming bivalent signals, an additional input terminal for receiving the desired bivalent output signal. The device an output terminal for supplying a bivalent output signal, and is characterized in that each input terminal is connected to an input of a non-self-adapting signal transformer which converts every combination of incoming signals into a signal with the value 1 at just one of $n$ outputs, where $n$ is the number of different combinations of the incoming signals. Every output of the non-self-adapting signal transformer is connected to an input of a separate gate circuit of which another input is connected to the additional input terminal. The output of each gate circuit is connected through an or-gate to the output terminal. Each gate circuit is arranged to open as soon as it receives coincident signals with the value 1 at its two inputs.

Figure 2:
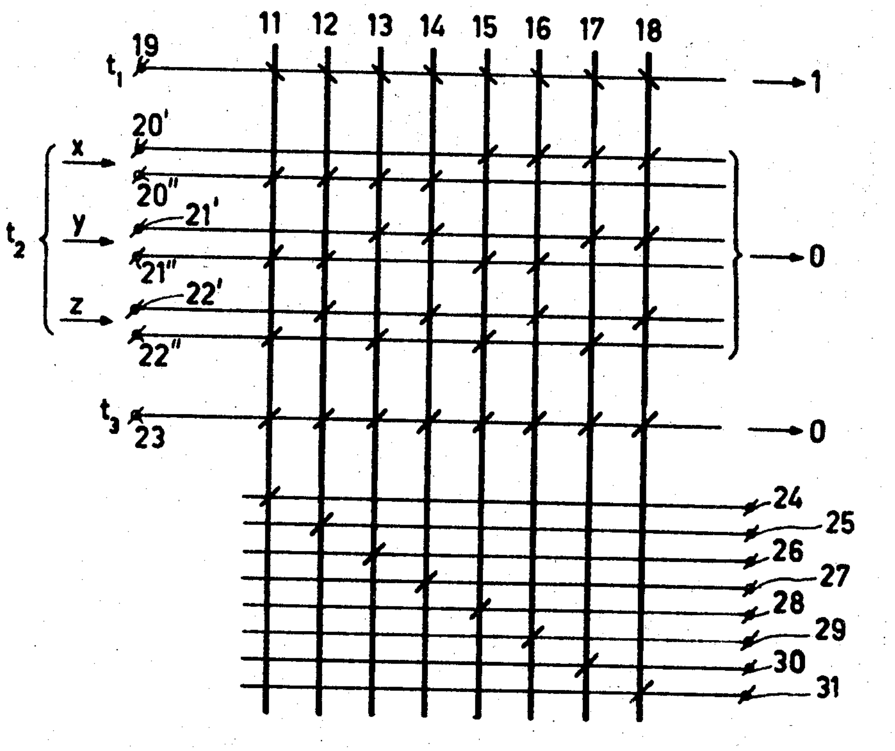
Figure 3:
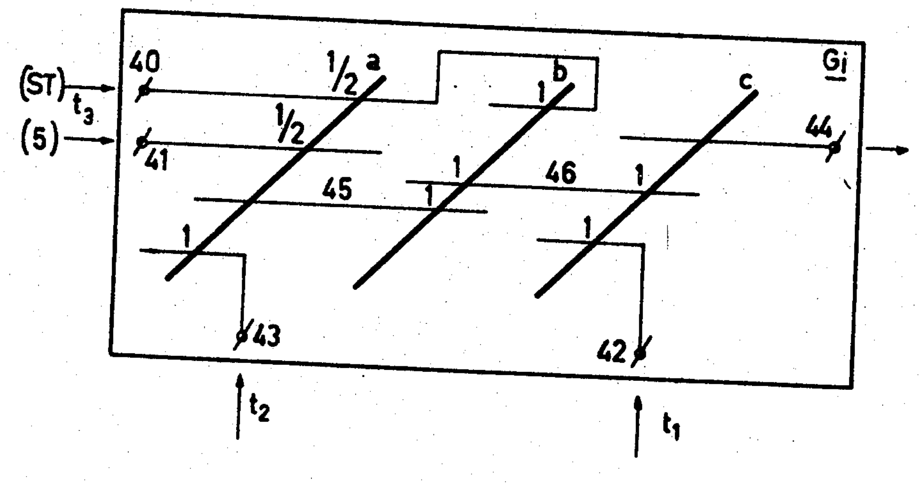

In order that the invention may readily be carried into effect, one embodiment thereof will now be described by way of example only in greater detail, with reference to the accompanying drawings, in which:

FIG. 1 is a block-schematic diagram to explain the idea underlying the self-adapting signal transformer according to the invention, FIGURES 2 and 3 show two possible embodiments of two components of the self-adapting signal transformer shown in outline in FIG. 1.

The self-adapting signal transformer shown in FIG. 1 includes three input terminals 1, 2, 3, an output terminal 4 and an additional input terminal 5. The three input terminals 1, 2 and 3 receive three bivalent input signals $x$, $y$ and $z$ which together form a ternary input code group. The output terminal 4 supplies the bivalent output signal $u$, and the additional input terminal 5 receives the desired bivalent output signal v. The three signals $x$, $y$ and $z$ are conveyed to a signal transformer ST, which converts every incoming code group, that is to say combination of signal values of the three signals $x$, $y$ and $z$, into a code group of 1-out-of-8 code (because there are $2^3=8$ different incoming code groups). When an incoming code group is received, one of the eight outputs of the signal transformer ST consequently supplies a signal with the signal value 1, the remaining seven outputs supply a signal with the signal value 0.

Every output of the signal transformer ST is connected to an input of a gate circuit $G_i$ ($i=1, 2, \ldots 8$), a second input of which is connected to the additional input 5. The outputs of the gate circuit $G_i$ are connected to the output 4 through an or-gate O.

In the explanation of the operation of this self-adapting signal transformer (0, 0, 0) is termed the first incoming code group, (0, 0, 1) the second, (0, 1, 0) the third . . . (1, 1, 1), the eights. Further it is assumed that all the signals consist of a pulse (signal value 1) or no pulse (signal value 0).

Each of the gate circuits $G_i$ is constructed so that initially it only supplies signals with the signal value 0 but, as a result of the simultaneous reception of a signal with the signal value 1 at its two inputs, is set in a condition in which it permanently passes the signals received from the signal transformer ST independent of value of the signal received at its other input from the additional input terminal 5.

The operation of the circuit arrangement is as follows: Let it be assumed that the circuit arrangement has received the code group (1, 0, 1) (the sixth) and that the desired output signal has the value 1. The signal transformer ST then delivers a signal with the value 1 at its sixth output and a signal with the signal value 0 at its remaining outputs. Because the desired output signal $v$ has the value 1, the gate circuit $G_6$ then simultaneously receives signals with the value 1 at its two inputs and is as a result set in the condition in which it passes all the signals received from the signal transformer ST. On the contrary, all the remaining gate circuits receive only at one input a signal with the value 1, and then do not vary their conditions. From this instant on, each time when the circuit arrangement receives the code group (1, 0, 1), the gate circuit $G_6$ will transmit to the output terminal 4 the signal with the signal value I, which it then receives from the sixth output of the signal transformer ST, in other words, the circuit arrangement has learned to react in the desired manner to the reception of the code group (1, 0, 1).

Let it now be assumed that the circuit arrangement receives another code group, for example, the code group (0, 1, 1) (the fourth) and that the output signal desired therefrom has the value 0. The signal transformer ST now delivers a signal with the value 1 at its fourth output and a signal with the signal value 0 to all its remaining outputs. Because the desired output signal $v$ now has the value 0, the gate circuit $G_4$ receives at only one of its two inputs a signal with the value 1, whereas all the remaining gate circuits receive a signal with the signal value 0 at both inputs. None of the gate circuits $G_i$ consequently varies its condition. Each time when the circuit arrangement subsequently receives the code group (0, 1, 1) it will react thereto by transmitting an output signal with the signal value 0. Thus the circuit arrangement has also learned how to react to the reception of the code group (0, 1, 1).

FIG. 2 shows a known very simple construction for the signal transformer ST. This signal transformer receives each of its input signals $x$, $y$ and $z$ in the form of a pulse in one of two wires. The signal $x$, for example, is received in the form of a pulse to the input terminal 20′ when $x=0$, and in the form of a pulse to the input terminal 20″ when $x=1$. The same holds for the signals $y$ and $z$ with respect to the pairs of input terminals 21′, 21″ and 22′, 22″. The signal transformer further comprises two supply terminals 19 and 23 and eight output terminals 24, 25 . . . 31. The signal transformer mainly consists of eight cores 11, 12 . . . 18 of a material having a rectangular magnetic hysteresis loop through which cores wires are threaded which are connected to the above mentioned terminals. In this case a notation is used which was first introduced by Jan Rajchman. The cores are indicated by heavy line segments, so that they are represented as they would be seen when viewing in the direction of their planes. The fact that a particular wire is threaded through a core is indicated by a short cross-line. For example, the wire connected to the terminal 20′ is not threaded the cores 11, 12, 13 and 14 but through the cores 15, 16, 17 and 18. A pulse through the wire connected to the terminal 19 sets all the cores to a condition indicated by the symbol 1, a pulse, for example, through the wire connected to the terminal 20′ sets all the cores through which this wire is threaded (i.e. the cores 15, 16, 17 and 18) to the condition 0. This is indicated in the figure in that the cross-lines for the wire connected to the terminal 19 are drawn as sloping from top left to bottom right and for the wire connected to the terminal 20′ from top right to bottom left.

The operation of the circuit arrangement is as follows. At the instant $t_1$ of a pulse cycle the terminal 19 receives a clock pulse and all the cores are set to the condition 1. At the instant $t_2$ of the same pulse cycle the circuit arrangement receives or does not receive a code group. Let it first be assumed that the circuit arrangement does receive a code group and that the sixth code group (1, 0, 1) is received, that is to say that the terminals 20″, 21′ and 22″ receive a pulse. These pulses reset the cores 11, 12, 13, 14, 15, 17 and 18 to the condition 0 but the core 16 remains to the condition 1 because this is the only core through which no wire connected to any of the terminals 20″, 21′ or 22″ is threaded, so that it is the only core which does not receive a pulse which sets the core to the condition 0. When no code group is received, the input terminals 20′, 20″, 21′, 21″, 22′, 22″, all receive a pulse and the cores are all reset to the condition 0. At the instant $t_3$ of the same pulse cycle the terminal 23 receives a readout clock pulse. When the circuit arrangement had received a code group at the preceding instant $t_2$, one of the cores is in the condition 1 and is consequently reset to the condition 0 at the instant $t_3$. When at the preceding instant $t_2$, the circuit arrangement had not received a code group, all the cores are already in the condition 0 and consequently nothing happens at the instant $t_3$.

From the above it may be concluded that (1) At every instant $t_1$ all the output terminals 24–31 supply a negative pulse because all the cores are then set from the condition 0 to the condition 1;

(2) At an instant $t_2$, at which a code group is received, all the output terminals but one supply a positive pulse because all the cores but one are then set from the condition 1 to the condition 0. At an instant $t_2$, at which no code group is received, all the output terminals supply a positive pulse, because all the cores are then set from the condition 1 to the condition 0;

(3) At the instant $t_3$ of a pulse cycle at which a code group is received, one of the output terminals supplies a positive pulse, because then only one of the cores is set from the condition 1 to the condition 0. At the instant $t_3$ of a pulse cycle in which no code group is received, none of the output terminals supplies a pulse because then none of the cores changes its condition.

It is assumed above that the code elements forming a code group are each presented through two wires of which either one or the other conducts a pulse in accordance with the fact whether that code element is a 0 or a 1. When no code element is presented, neither of these two wires conduct a pulse. It may happen, of course, that the code elements are presented in a different manner, for example, sequentially, or each code group through a single wire. The code elements presented in such a different manner, however, can be converted according to known methods and with known means into the required form so that this supposition is not essential.

FIGURE 3 shows the circuit diagram of a gate circuit $G_i$ to be used in the signal transformer of FIGURE 1. This circuit arrangement mainly comprises three cores $a$, $b$ and $c$ of a material having a rectangular hysteresis loop and has two input terminals 40 and 41 of which the first is connected to the corresponding output terminal of the signal transformer ST and the other to the additional input terminal 5 (see FIG. 1). The circuit arrangement further comprises two supply terminals 42 and 43 of which the former receives a clock pulse at the instant $t_1$ and the second at the instant $t_2$ of each pulse cycle. Finally, the gate circuit comprises an output terminal 44.

Each of the above terminals is connected to a wire which is threaded, in the manner indicated in the figure, through one or more of the cores $a$, $b$ or $c$. The figure shows each wire threaded only once through a core but this need not be the case since a wire may also be threaded several times through the same core. The number ½ at the point where a line representing a wire crosses a line segment representing a core means that a pulse in that wire corresponds to half of the number of ampere turns required to set said core from one condition to the other. The number 1 at such a point of intersection means that a pulse in that wire corresponds to a number of ampere turns which is sufficient to set the core in question from one condtion to the other. The cores *a* and *b* are coupled through a wire 45 in a manner such that a change over of the core *a* results in a change over of the core *b* in the opposite sense, but a change over of the core *b* does not result in a change over of the core *a* (unilateral coupling). The cores *b* and *c* are coupled through a wire 46 in a manner such that a change over of the core *b* causes a change over in the opposite sense of the core *c* and conversely (bilateral coupling).

The operation of this circuit arrangement is as follows: Initially the cores *a*, *b* and *c* are in the condition 0. Let it be assumed that at the instant $t_3$ of a pulse cycle a pulse is received from the signal transformer ST and from the additional input terminal 5. As a result of this, the core *a* is set to the condition 1. At the instant $t_2$ of the following pulse cycle the core *a* is reset to the condition 0, as a result of which the core *b* is set to the condition 1. Let it be assumed that at the following instant $t_3$ no pulse is received from the signal transformer ST so that at this instant the conditions of the cores *a*, *b* and *c* do not vary. This also holds for the next instants $t_1$ and $t_2$ of the third pulse cycle. Let it further be assumed that at the instant $t_3$ of this pulse cycle exclusively a pulse is received from the signal transformer ST. This pulse resets the core *b* to the condition 0, as a result of which the core *c* is set to the condition 1. At the instant $t_1$ of the fourth pulse cycle, the core *c* is reset again to the condition 0, as a result of which the output terminal 44 supplies a positive output pulse and the core *b* is reset to the condition 1, as a result of which the condition at the beginning of the third pulse cycle is recovered. Hence the gate circuit is set to the condition in which it transmits signals received from the signal transformer ST unchanged.

What is claimed is:

1. A self-adaptive signal transforming system, comprising a converter having a plurality of input terminals and a plurality of output terminals, said converter being adapted to produce an output signal at one of said output terminals in response to pre-determined combinations of signals at said input terminals; OR gate means having a separate input terminal corresponding to each of said output terminals of said converter and having an output terminal; a separate bistable gate means corresponding to each output terminal of said converter, each said bistable gate means having a first input terminal, a second input terminal, and a third terminal, whereby said bistable gate means provides a signal path between said first terminal and said third terminal in response to the concurrence of signals on said first and second terminals; means for connecting each of said first input terminals of said bistable gate means to a different one of said output terminals of said converter; means for connecting each of said third terminals of said bistable gate means to a corresponding input terminal of said OR gate means; and a source of bivalent control signals connected to each of said second input terminals.

2. A signal transformer system as claimed in claim 1 wherein said bistable gate means comprises a first magnetic core having a substantially rectangular magnetic hysteresis loop and having a first and second stable state, means for setting said first core to said first state in response to a concurrence of signals on said first and second terminals, a second magnetic core having a substantially rectangular hysteresis loop and having a first and second stable state, clock means for resetting said first core to said second state, means for setting said second core to said first state in response to said change of state of said first core from said first to said second state, a third magnetic core having a substantially rectangular hysteresis loop and having a first and a second magnetic state, means connected between said first terminal and said second core for re-setting said second core to said second state in response to a corresponding output signal of said converter, means for setting said third core to a first stable state in response to a change of state of said third core from said first to said second stable state, clock means for resetting said third core to said second stable state, means for setting said second core to said first state in response to a change of state of said third core from said first state to said second state, and means responsive to said change of state of said third core from said first state to said second state for providing an output signal for said third terminal of said bistable gate means.

References Cited

UNITED STATES PATENTS

| | | | |
|---|---|---|---|
| 3,003,143 | 10/1961 | Beurrier | 340—347 |
| 2,686,299 | 8/1954 | Eckert | 340—347 |

STANLEY M. URYNOWICZ, Jr., *Primary Examiner.*

U.S. Cl. X.R.

340—347

UNITED STATES PATENT OFFICE
CERTIFICATE OF CORRECTION

Patent No. 3,443,117 May 6, 1969

Jan Frederik Schuh

It is certified that error appears in the above identified patent and that said Letters Patent are hereby corrected as shown below:

Column 2, line 20, "signal." should read -- signal, --; lines 21 and 22, "The device an output terminal for supplying a bivalent output signal, and" should read -- and an output terminal for supplying a bivalent output signal. The device is characterized in that each input --; line 70, "eights" should read -- eighth --.

Signed and sealed this 14th day of April 1970.

(SEAL)
Attest:

Edward M. Fletcher, Jr.
Attesting Officer

WILLIAM E. SCHUYLER, JR.
Commissioner of Patents